United States Patent
Chmeissani Raad et al.

(10) Patent No.: US 8,497,484 B2
(45) Date of Patent: Jul. 30, 2013

(54) DEVICE FOR DETECTING HIGHLY ENERGETIC PHOTONS

(75) Inventors: Mokhtar Chmeissani Raad, Barcelona (ES); José M. Álvarez Pastor, Salamanca (ES); Carlos Sánchez Sánchez, Barcelona (ES)

(73) Assignees: Institut de Fisica d'Altes Energies and X-Ray Imatek, S.L., Bellaterra (ES); Consejo Superior de Investigaciones Cientificas, Madrid (ES)

( * ) Notice: Subject to any disclaimer, the term of this patent is extended or adjusted under 35 U.S.C. 154(b) by 0 days.

(21) Appl. No.: 13/120,450

(22) PCT Filed: Sep. 9, 2009

(86) PCT No.: PCT/EP2009/061663
§ 371 (c)(1),
(2), (4) Date: Mar. 23, 2011

(87) PCT Pub. No.: WO2010/034619
PCT Pub. Date: Apr. 1, 2010

(65) Prior Publication Data
US 2011/0253901 A1    Oct. 20, 2011

Related U.S. Application Data

(60) Provisional application No. 61/099,271, filed on Sep. 23, 2008.

(30) Foreign Application Priority Data

Sep. 23, 2008    (EP) ..................................... 08164936

(51) Int. Cl.
*H01L 27/146* (2006.01)

(52) U.S. Cl.
USPC ...................................................... 250/370.09

(58) Field of Classification Search
USPC   250/370.01–370.15, 363.01–363.1; 378/98.8
See application file for complete search history.

(56) References Cited

U.S. PATENT DOCUMENTS 6,362,482 B1    3/2002    Stettner et al.
6,586,744 B1    7/2003    Griesmer et al.
(Continued)

FOREIGN PATENT DOCUMENTS

DE    102005037902 A1    2/2007
FR    2793954 A1    11/2000

OTHER PUBLICATIONS

Olcott et al., "Data acquisition system design for a 1 mm3 resolution PSAPD-based PET system," 2007, IEEE Nuclear Science Symposium Conference Record pp. 3206-3211.*

(Continued)

*Primary Examiner* — Kiho Kim
(74) *Attorney, Agent, or Firm* — Peter B. Scull; Hamilton, DeSanctis & Cha, LLP (57) ABSTRACT

A device (10) for detecting highly energetic photons, comprising one or more pixelated solid-state detectors (11) for detecting the highly energetic photons; means for providing a high voltage for polarizing said solid-state detectors; one or more pixelated readout elements (30), a readout element being connected to each of said one or more pixelated solid-state detectors (11); an input/output element (12) connected to said readout elements (30) for data input and output; and a base layer (13) for mounting the pixelated solid-state detectors (11), the readout elements (30) and the input/output element (12).

21 Claims, 9 Drawing Sheets

U.S. PATENT DOCUMENTS

| | | | |
|---|---|---|---|
| 2003/0006376 | A1 | 1/2003 | Turner |
| 2005/0061984 | A1 | 3/2005 | Hoffman |
| 2007/0057191 | A1 | 3/2007 | Ueno et al. |
| 2008/0042070 | A1* | 2/2008 | Levin ................... 250/370.13 |
| 2008/0240339 | A1* | 10/2008 | Du et al. ....................... 378/5 |
| 2009/0290680 | A1* | 11/2009 | Turner et al. ................... 378/62 |

OTHER PUBLICATIONS

Visvikis et al.,"Monte Carlo based performance assessment of different animal PET architectures using pixellated CZT detectors," 2006, Nuclear Instruments and Methods in Physics Research A, vol. 569, pp. 225-229.*

International Search Report and Written Opinion for PCT Application No. PCT/EP2009/061663 issued by the European Patent Office dated Dec. 16, 2009.

International Preliminary Report on Patentability for PCT Application No. PCT/EP2009/061663 issued by the European Patent Office dated Mar. 4, 2011.

S. Gambhir et al., "A tabulated summary of the FDG PET literature", Journal of Nuclear Medicine: 2001: vol. 42, No. 5 (supl.); pp. 1S-93S.

N. Shedad et al., "Small animal PET camera design based on 2mm straw detectors", Nuclear Science Symposium Conference Record 2006: IEEE, Piscataway, NJ, USA; Oct. 1, 2006; pp. 2462-2468.

Kapton, entry from Wikipedia, the free internet encyclopedia, accessed and downloaded Mar. 5, 2013, pp. 1-4; http://en.wikipedia.org/wiki/Kapton.

Calderon, Y. et al, Modeling, Simulation, and Evaluation of a Compton Camera Based on a Pixelated Solid-State Detector (the year of publication is sufficiently later than the effective U.S. filing date and any foreign priority date so that the particular month of publication is not an issue), Oct. 2011, pp. 2708-2715, 2011 IEEE Nuclear Science Symposium Conference Record; Orlando, Florida, USA.

Morimoto, Y. et al, Development of a 3D Brain PET Scanner Using CdTe Semiconductor Detectors and Its First Clinical Application, Oct. 2011, pp. 2708-2715, vol. 58, No. 5, IEEE Transactions on Nuclear Science, published by Nuclear & Plasma Sciences Society, Albuquerque, New Mexico, USA.

Chmeissani, P. et al, Modeling and Simulation of PET scanner Based on Pixelated Solid-State Detector, (the year of publication is sufficiently later than the effective foreign priority date so that the particular month of publication is not in issue), 2009, pp. 3496-3502, Oct. 2009 IEEE Nuclear Science Symposium conference Record; Valencia, Spain.

* cited by examiner

DEVICE FOR DETECTING HIGHLY ENERGETIC PHOTONS

CROSS-REFERENCE TO RELATED APPLICATIONS

The present application is a 35 USC §371 National Phase filing of PCT Application Number PCT/EP2009/061663, filed 9 Sep. 2009, which claims priority from the European Patent Application No. 08164936.0, filed 23 Sep. 2008, and from the U.S. Provisional Application No. 61/099,271, filed 23 Sep. 2008, entitled "Device for Detecting Highly Energetic Photons," the subject matter of which is hereby being specifically and entirely incorporated herein by reference for all that it discloses and teaches.

The present invention relates to a device for detecting highly energetic photons. More specifically, the invention relates to a device comprising pixelated room temperature solid-state detectors that detect gamma ray photons, generated by radioactive material inside a patient's body.

The invention finds particular use in medical diagnostic imaging apparatus.

BACKGROUND ART

The Positron Emission Tomography (PET) is a diagnostic technique that obtains images that show the metabolism and functioning of tissues and organs (for example, the central nervous system).

Like other diagnostic techniques in Nuclear Medicine, PET is based in detecting and analyzing the distribution inside the body of radioisotopes which have previously been administered to a patient. The radioisotopes may be taken in orally, they may be inhaled as gas or may be administered through an injection.

Several positron-emitting radioisotopes for medical use are known. The most commonly used is Fluorine-18, which is capable of joining a glucose tracer to get 18-fluoro-deoxy-glucose ($^{18}$F-FDG). In this way, glucose that is detectable by the emission of radioactive signal is obtained.

After administration of the radioisotopes, the radioisotopes spread throughout the area of the body to be examined and tend to be taken up by e.g. cancer cells. When the radioisotope decays, it emits a positron which after a few millimetres annihilates with an electron. This produces a pair of gamma ray photons moving in opposite direction, each photon having an energy of 511 keV. This pair of gamma ray photons can be detected using a so-called PET scanner. Using the location of detection of both gamma ray photons, the Line of Response (LOR) (which is the line connecting the two locations of detection of the gamma photons) can be reconstructed. This procedure is schematically illustrated in FIG. 14.

Figure 14:
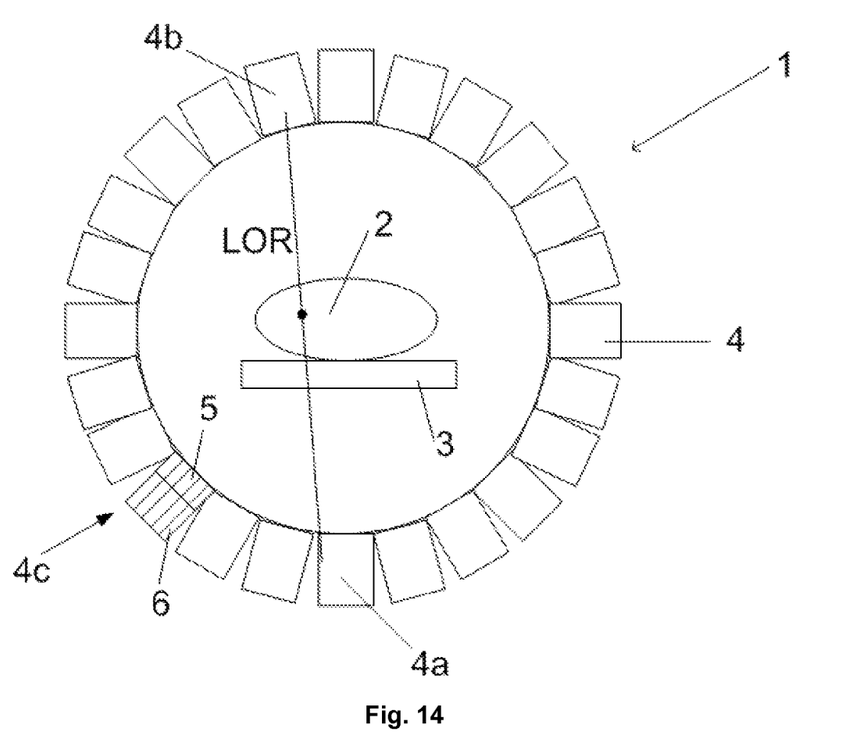
FIG. 14 shows a schematic representation of a conventional PET scanner.

FIG. 14 shows a conventional PET scanner 1, in which a bed 3 is provided. Upon this bed, a body 2 of a human or an animal is schematically indicated. Around the circumference of the PET scanner, a plurality of detectors 4 is provided. The gamma ray photons which move in opposite direction are detected respectively by detector 4a and detector 4b. Using this detection, the LOR can be reconstructed.

After collecting several such events, points where multiple LOR's intersect can be determined. These points indicate a concentration of the radioisotope and therefore the possible presence of cancer cells. The PET scanner is coupled to a computer, which is responsible for measuring the amount of radioisotopes absorbed by the body, and determining the LOR's. This way, it is possible to obtain images that provide details of both the structure and function of internal organs and other parts of the body.

In a typical PET protocol, the patient is injected with between 300 to 500 MBq of $^{18}$F-FDG (Fluorodeoxyglucose). After allowing one to one and a half hours for uptake, the patient is placed in the scanner for the scan. A typical PET scan on a conventional PET scanner requires around 30 minutes of scanner time.

PET plays an important role in tumour diagnostic. Its accuracy overtakes that of the conventional diagnostic imaging systems as one can see in the following table (from the *Journal of Nuclear Medicine Supplement*, Volume 42, Number 5, May 2001 and UCLA):

| Diagnostic Accuracy | | |
|---|---|---|
| Cancer Type | Conventional Imaging | PET |
| Breast | 67% | 89% |
| Colorectal | 80% | 94% |
| Gastro-Esophageal | 68% | 83% |
| Head & Neck | 65% | 87% |
| Liver | 81% | 93% |
| Lung | 68% | 82% |
| Lymphoma | 64% | 88% |
| Melanoma | 80% | 91% |
| Pancreatic | 65% | 81% |
| Testicular | 68% | 92% |
| Uterine/Cervical | 43% | 87% |

A PET scanner comprises a plurality of detectors. Nowadays, the current best detector for PET is based on LSO (Lutetium Oxyorthosilicate) crystals with a typical size of 4 mm×4 mm×10 mm. The crystals emit light flashes when hit by the gamma photons. These light flashes can be detected using a photomultiplier tube (PMT) which is coupled to the crystal. This has also been schematically indicated in FIG. 14. Detector 4c comprises a segmented crystal 5 and a plurality of PMT's 6. To the person skilled in the art, it will be clear that the plurality of PMT's 6 can also be replaced by a single position sensitive photomultiplier (PSPMT).

The light yield of LSO crystals for 511 keV gamma is about 4000 phe. The full width at half maximum (FWHM) that can be achieved with LSO crystals at 511 keV is around 10%. This limited energy resolution will reduce the ability to remove scattered events, which are one type of noise in the reconstructed image. The typical length (in radial direction, when used in a PET scanner) of the LSO crystal is about 10 mm and this implies that the detector's intrinsic uncertainty of the impact point in the radial direction is around 3 mm, which will lead to an error in the projection of the Line of Response. This can be readily understood when looking at FIG. 14. The PMT which registers an event essentially gives a two-dimensional coordinate. The radial position of where the gamma photon hits the crystal is lost. This loss of information gives rise to a parallax effect, which can lead to an error in the projection of the LOR. This error naturally deteriorates the quality of the reconstructed image.

Another drawback is the shape of the crystals of the detector, which is rectangular parallelepiped and when forming a cylindrical shape from such components (for example, for a PET scanner), it is inevitable to have cracks at the contact points of the crystals.

Another example of medical diagnostic imaging apparatus is a gamma camera. Gamma cameras are also widely used in nuclear medicine. It consists of a single detector plane, formed by a plurality of scintillating crystals, and a collimator in front of it. Only photons in a small angular range reach the detector through holes in the collimator; the others are absorbed by the collimator. Therefore, a two dimensional projection of the source distribution is recorded by the detector plane.

Single Photon Emission Computed Tomography (SPECT) is a nuclear medicine tomographic imaging technique using a gamma camera. SPECT imaging is performed by using the gamma camera for acquiring multiple two dimensional images at different angles. A computer is then used to apply a tomographic reconstruction algorithm to the multiple projections, yielding a three-dimensional image.

Compton cameras are another example of medical diagnostic imaging apparatus. Compton cameras are used to reconstruct gamma-ray emitting radioisotope distributions. The range of applications is vast: apart from diagnosis in nuclear medicine, they may also be used for monitoring of decommissioning of nuclear power plants and also find application in homeland security (e.g. for scanning shipping containers for the presence of radioactive material).

A Compton camera has two detection planes. Photons emitted from the source are scattered in the first plane (Compton scattering) and absorbed in the second plane (photoelectric effect). In both planes the position of the interaction and the energy deposited are measured. The first plane is usually made from semiconductor material and the second plane from scintillating crystals. The detectors are operated in coincidence, so that only photons that interact with both detectors and deposit a total energy within a given window are recorded. Using the location of detection and the energy of the photon, the point of origin of the photon can be calculated, using the so-called Compton formula.

In summary, in nuclear medical imaging, several techniques and apparatus are known (PET, SPECT, gamma camera, Compton camera) which conventionally use detectors based on scintillating crystals.

The detectors based on scintillating crystals suffer from various disadvantages: In PET scanners, cracks are inherently present at the contact points of adjacent parallelepiped crystals. As has been described before for PET scanners, a parallax effect may occur. The crystals used in PET scanners, gamma cameras or Compton cameras have a size of 4 mm×4 mm×10 mm, so this determines the intrinsic error (and the intrinsic spatial resolution) that they have. It is not possible to see anything smaller than 4-5 mm in case of PET scanning. For SPECT, this is in the order of 15-20 mm. The spatial resolution will even be considerably worse since the detectors do not work with 100% efficiency.

Another problem with scintillating crystals is that the Detection Quantum Efficiency (DQE) of scintillating crystals is rather poor. In order to improve this DQE, one would have to increase the length of the crystal to increase the probability of capturing the gamma photons. However, adding more material would not necessarily improve the quality of the signal, since a part of the light produced in the crystals at a location that is relatively far away from the photomultiplier would be attenuated before reaching the PMT. A gamma photon captured by the crystal close to the PMT will yield more photons than a gamma photon captured further away from the PMT. Hence, the energy resolution gets worse at the expense of detecting more gamma photons. Therefore the standard length of scintillating crystals (10 mm) used in gamma detectors is a compromise to obtain reasonable DQE and simultaneously have an acceptable energy resolution.

To overcome the inconveniences of scintillating crystals mentioned before, it has been suggested to use pixelated room temperature solid-state detectors in PET detectors. With pixelated solid-state detectors, high spatial resolution can be achieved due to the fact that the detector can be segmented to the sub-millimetre pixels (or voxels).

One of the problems of using solid-state detectors in a PET scanner is that thick detectors are needed to achieve high gamma ray absorption. In particular, one needs a thickness of 4 cm (when using CdTe) to capture 90% of photons with energy of 511 keV.

In literature, it has been suggested to use very large sensors (e.g. 10 mm×10 mm×10 mm) of Cd(Zn)Te in which a pixel readout chip is coupled to the backside of the crystal. This solution looks easy on paper but in reality it is not. Firstly, the cost of such large CdTe detectors of good quality is very high. Secondly, the time collection of the signal will be very long and hence it will not be possible to use it in PET as trigger. Thirdly, with such a thick detector (10 mm), the energy spectroscopy deteriorates significantly due to trapping and the lifetime of the electron-hole.

U.S. 2007/0057191 discloses a radiological imaging system comprising a first and second imaging apparatus. Said first imaging apparatus comprises an array of (non-pixelated) semiconductor radiation detectors. The array of detectors is connected through wiring to ASICs. Since the detectors used in this system are not pixelated, the accuracy that may be achieved is inherently limited. The detectors used are at least 2 mm×2 mm. The accuracy is thus limited to these dimensions. Furthermore, in practice it will be very complicated and costly to use detectors of these dimensions, so that bigger detectors will be needed. Also, between all of the detectors, gaps are present. These gaps, which represent dead areas in which no events can be detected, and the way the arrays of detectors are packaged and arranged lead to limited detection efficiency. The wiring used to connect an individual detector to the pre-amplifier leads to parasitic capacitance, inductance and resistance and therefore increases the over all noise to signal ratio.

SUMMARY OF THE INVENTION

It is an object of the present invention to provide a device for detecting highly energetic photons, which overcomes at least part of the disadvantages of the prior art detectors.

It is a further object of the present invention to provide a device for detecting highly energetic photons with a high spatial resolution and a high detection efficiency. High spatial resolution provides exact location (x,y,z) of the impact point of the gamma photon; high detection efficiency helps in the reduction of radiation doses.

Another object of the present invention is to provide a device for detecting highly energetic photons with improved energy resolution to eliminate a large fraction of the scattered events and increase the Signal-to-Noise ratio (SNR). This leads to a high contrast image.

To achieve the above objects, the invention provides a device for detecting highly energetic photons, comprising at least one pixelated solid-state detectors for detecting the highly energetic photons; means for providing a high voltage for polarizing said solid-state detectors; at least one readout elements connected to said pixelated solid-state detectors; an input/output element connected to said readout elements for data input and output; and a base layer for mounting the pixelated solid-state detectors, the readout elements and the input/output element.

Instead of using a scintillating crystal (with its mentioned inconveniences), the invention provides a pixelated solid state detector for detecting highly energetic photons. A typical pixel size may be 1 mm×1 mm, but it is possible to make pixelated solid state detectors with pixel sizes of e.g. 10 μm×10 μm. The invention thus offers a tremendous potential of spatial precision. This precision can never be reached using scintillating crystals. A device may thus be tailored to specific needs in different applications. It is even possible to vary the pixel size within a single solid-state detector. Also, there are no dead areas between the pixels of the detectors. Even an event occurring between two pixels can still be detected by two pixels together.

Additionally, because of its modular and simple built-up, a plurality of devices can easily be combined to appropriate size in three dimensions.

In a second aspect, the invention provides a module for detecting highly energetic photons comprising a plurality of devices according to the present invention, the devices being arranged in such a way that the combined pixelated solid-state detectors of the devices form a three-dimensional detector.

Each device according to the invention essentially forms a two-dimensional detector. By placing at least one device on top of another one, a three-dimensional detector has been created. Because the detector is three-dimensional, a parallax effect (as was discussed in PET scanners) can be avoided. Because of the modular built-up of the device, as many devices as one wishes may be combined to build a detector of increased thickness and hence increased DQE, but without compromising energy resolution or spatial resolution.

The typical thickness of the solid-state detectors used in the devices may be 2 mm (but other thicknesses are of course possible). It is possible to combine a plurality of these devices to an appropriate thickness without encountering problems related to e.g. time collection of thick conventional solid state detectors.

Moreover, the invention provides a detector which can be used in strong magnetic fields. A detector based on the invention can thus be combined with e.g. an MRI scanner into a single scanner, which allows a PET scan and an MRI scan to be performed simultaneously.

In some embodiments, the base layers of the devices have an isosceles trapezoidal shape. By giving the base layers of the devices an isosceles trapezoidal shape and adapting the size and shape of the readout element(s) and pixelated solid-state detector(s) mounted on it to this trapezoidal shape, a device is obtained which is especially adapted to be fitted in a circular ring. This is particularly useful for applications in PET scanners.

Optionally, both the pixelated solid-state detectors and the base have an isosceles trapezoidal shape. The detectors may also have a different shape, as long as they are adapted to the shape of the base layer. It would be possible e.g. to form a trapezoidal shape by using two separate detectors having suitable quadrilateral shapes. One particularly interesting option is however to give the solid-state detectors a corresponding isosceles trapezoidal shape, so that they can be fitted exactly on the base layers. The readout elements however normally retain their rectangular shape. In some embodiments according to the invention, the device therefore further comprises an intermediate layer mounted between the solid-state detector and the readout element to adapt for any offset between the pixel pads of detectors and corresponding pixel channels on readout elements In the case that the pixelated solid-state detector has an isosceles trapezoidal shape, the pixel size of the detector varies along the height of the trapezoid to adapt for the change in width (with a constant number of pixels along the entire height of the trapezoid).

In some embodiments, the base layers of the devices have a rectangular shape. This shape is especially useful for applications such as in gamma cameras and Compton cameras.

Preferably, in the module according to the invention, the input/output elements of the plurality of devices are connected to a single interface. A particularly advantageous way of building a module is by connecting the signal input/output elements of the plurality of devices to a single interface element, which may be e.g. a printed circuit board (PCB). The data collected by the plurality of devices can thus be collected and passed on using the single interface.

Optionally, in the module according to the invention, at least part of the solid-state detectors of the devices are arranged in a staggered way with respect to each other. By arranging the solid state detectors in a staggered way, a more rigid structure is obtained, since the detectors of one device give some support to the other devices.

Optionally, the module comprises devices, wherein the pixelated solid-state detector, the readout element and the input/output signal element are received on a top side of the base layer and wherein the bottom side of the base layer comprises means for providing a high voltage to polarize the pixelated solid-state detectors on an adjacent device. In the art, several ways of providing the high voltage for polarizing a solid-state detector are known, e.g. through suitable wiring. Taking advantage of the fact that a module is built-up of from a plurality of basic devices, one device can provide the means for polarizing the pixelated solid-state detector of an adjacent device by arranging these on the bottom side of the device. Only a device at the "edge" of a module (most likely the first one) may need other means, e.g. an additional kapton layer.

Optionally, the module comprises devices wherein the solid-state detectors are mounted on the readout elements. Each pixel pad of a solid-state detector can be connected to an input pixel channel on the readout element (no wiring is needed). In other embodiments, the readout elements and solid-state detector may be arranged next to each other (instead of on top of each other).

In some embodiments, the devices further comprise an intermediate layer mounted between the solid-state detectors and the readout elements to adapt for any offset between the pixel pads of the solid-state detectors and the pixel channels on the readout elements. In embodiments wherein the size of the solid state detector changes along a determined direction (e.g. in the devices wherein the base layer has an isosceles trapezoidal shape, which are especially adapted to be used to form a circular ring, the shape of the solid state detector changes in a radial direction), the pixel size changes as well along this direction. For this reason, an intermediate layer may serve as an interface to adjust any offset between the pads on the detector and input channels on the readout element. The intermediate layer may be a kapton layer.

In a third aspect, the invention provides a system for detecting highly energetic photons comprising a plurality of modules, wherein the plurality of interfaces of the modules are connected through suitable connectors to a single interface bus. The single interface bus can collect the data from all events happening in the solid-state detectors through data collected by the readout elements. It can also provide the necessary operating voltages.

Optionally, a system comprises solely modules built-up of devices having a trapezoidal shaped base layer (and appropriately shaped other elements). This way, a ring-shaped detector for a PET scanner can be built.

Optionally, a system comprises solely modules built-up of devices having a rectangular shaped base layer (and appropriately shaped other working elements). This way, a gamma camera or a Compton camera with a detector with the shape of a rectangular prism can be built.

BRIEF DESCRIPTION OF THE DRAWINGS

Embodiments of the present invention will be described in the following, only by way of non-limiting example, with reference to the appended drawings, in which:

FIG. 2 to FIG. 5 are schematic representations of the step-by-step construction of the device of FIG. 1a;

FIG. 8 is a schematic representation of the system for detecting highly energetic photons, according to the invention, which comprises a plurality of modules of FIG. 6a;

DESCRIPTION OF EMBODIMENTS

In the following, a preferred embodiment of the device for detecting highly energetic photons according to the invention will be described. Next, preferred embodiments of a module (comprising a plurality of these devices), a system (comprising a plurality of modules), a PET scanner, a gamma camera and a Compton camera according to the invention will be described.

Figure 1A:
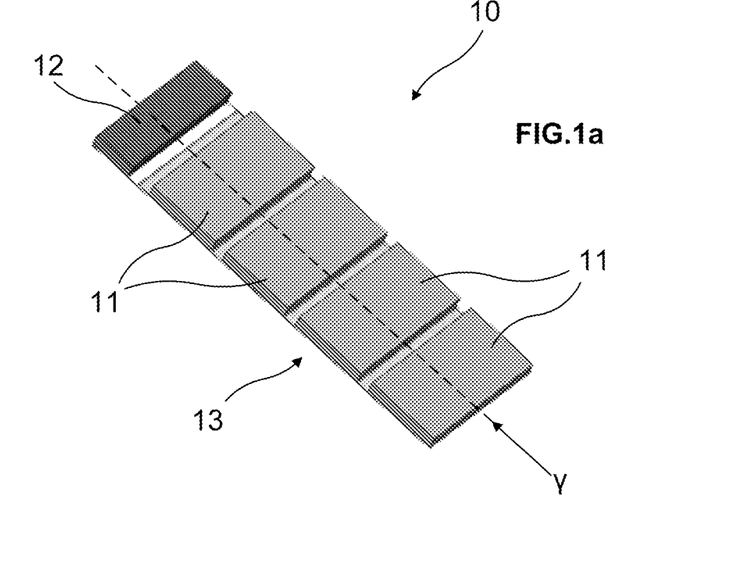
FIG. 1a is a schematic representation of a preferred embodiment of the device for detecting highly energetic photons, according to the invention.

In FIG. 1a, a preferred embodiment of a device according to the present invention is shown. The device 10 for detecting highly energetic photons comprises four modular pixelated room temperature solid-state detectors 11 in a tiled/stacked scheme; four ASICs (application-specific integrated circuit), one for each solid-state detector 11, acting as readout elements for them; an input/output element connector 12 connected to the ASICs for data input and output (that is, mainly for obtaining the values generated by the ASICs from the solid-state detector captured parameters); and a kapton layer 13 acting as a base layer, upon which the solid-state detector 11, the ASICs, and the input/output element 12 are mounted. Furthermore connectors 20 (not visible in FIG. 1a) are provided for connecting each individual ASIC 30 to input/output element 12. More specifically, the front plane of the kapton layer 13 is used for mounting the ASICs 30, connectors 20, the solid-state detectors 11, and the input/output element 12; in the back plane, kapton layer 13 comprises connections to a power supply that can provide High voltage to polarize solid-state detectors 11 of a neighbouring second device arranged next to the shown device. (This arrangement will be shown later, e.g. in FIG. 6a.)

Within the scope of the invention, in a device, a different number of solid-state detectors may also be provided.

In this embodiment, a room temperature solid state detector was used. Room temperature solid-state detectors may be e.g. from Si, Ge, GaAs, CdTe, CdZnTe or HgI2. Preferably a solid state semiconductor with high-Z (high number of protons in the nucleus) and good electron-hole mobility is used. Within the scope of the invention however, any pixelated solid state detector may be used.

In a presently preferred embodiment, the pixelated solid-state detectors 11 are CdTe detectors of approximate size of 2 cm×1 cm×0.2 cm; the pixel size is approximately of 1 mm×1 mm. The size of the detectors may also be chosen differently. Using the device with a thickness of 0.2 cm, it is possible to build a thick solid-state detector by combining a plurality of these devices. This detector will however not suffer from problems such as time collection in thick conventional solid-state detectors.

Further, each solid-state detector 11 is mounted on the corresponding ASIC, so that each pixel pad is connected independently to its own channel.

Figure 1B:
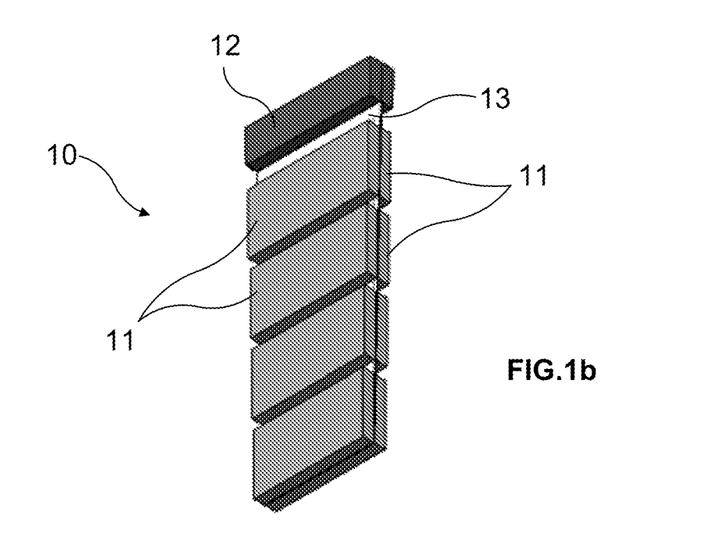
FIG. 1b is a schematic representation of another preferred embodiment of the device for detecting highly energetic photons, according to the invention.

In FIG. 1b, an alternative embodiment of the device according to the invention is schematically shown. A single device 10 is formed in this case by providing two rows of solid-state detectors 11 in a single device. The solid-state detectors are mounted on a base layer 13. For each row of solid-state detectors, an input/output element 12 is provided. An advantage of this design of the device is that it can be made slightly thinner than when two devices 10 according to FIG. 1a are combined.

In the following, a step-by-step construction (illustrated in FIGS. 2-5) of the device 10, shown in FIG. 1a, will be described.

Figure 2:
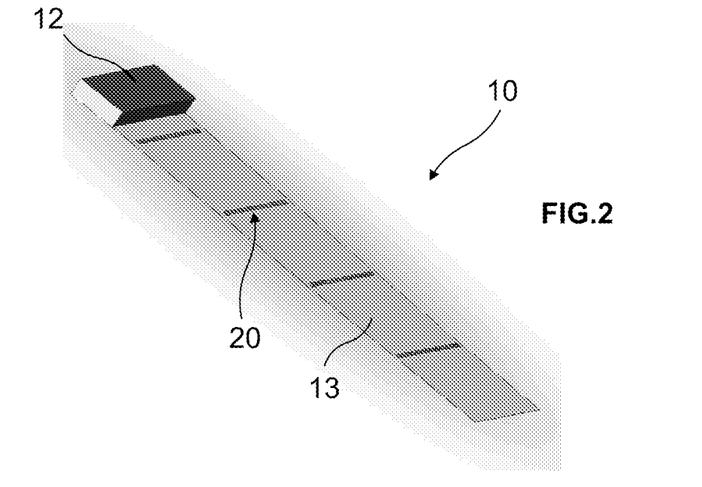

FIG. 2 shows the kapton layer 13 which on the top side provides the input/output element 12 and the connectors 20 for connecting input/output element 12 to each individual ASICs.

Figure 3:
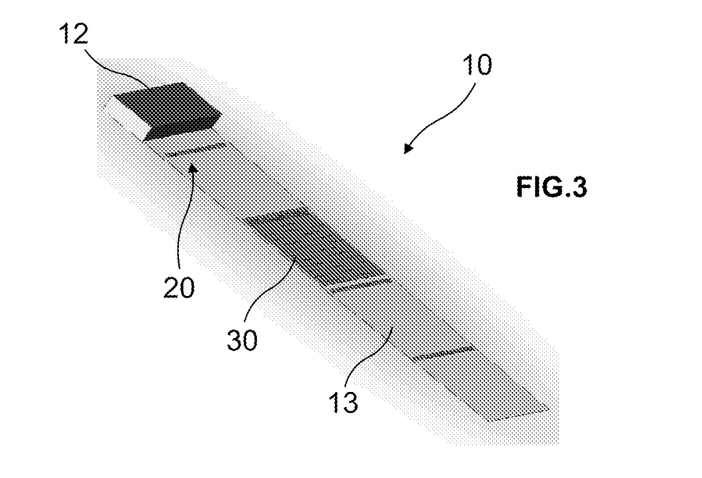

FIG. 3 shows the same kapton layer 13 with one ASIC 30 mounted on it. The ASICs have been thinned to a thickness 50 μm and the input/output connectors of the ASICs are made with metalized vias, so that it is possible to connect the ASIC to the kapton layer via bump-bond or conductive glue. Also, other ways of connecting may be used, e.g. anisotropic conductive films, such as commercially available from 3M™. It is also possible to use wirebonding. The shown layer 13 is designed to hold four ASICs, but obviously the number of ASICs to be connected can be different according to the requirements of the device 10.

Figure 4:
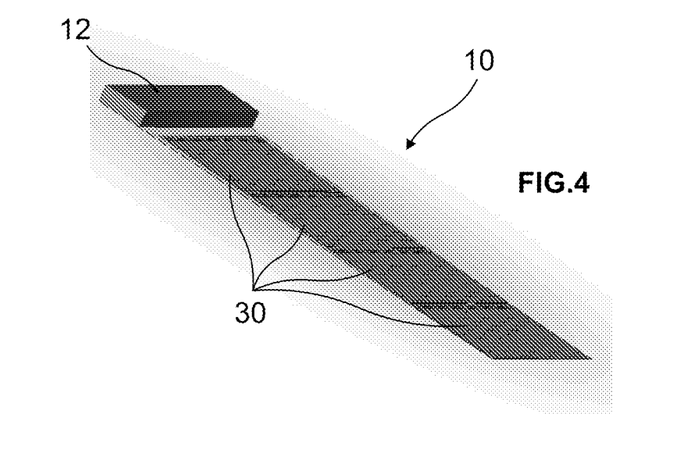

FIG. 4 shows the same layer 13 with the four ASICs 30 mounted on it. In this preferred embodiment, after mounting the four ASICs 30, an intermediate layer (kapton layer) is provided on top of the ASICs. The object of said intermediate layer is to connect each pixel pad of the corresponding solid-state detector 11 to an input pixel channel on the ASIC 30. Since the size of the solid-state detectors 11 can change along a determined direction, as will be described for some embodiments (e.g. FIG. 9a) below, the intermediate kapton layer serves as an interface to adjust any offset between the pads on the solid-state detector 11 and the input channel of the ASIC

30. The intermediate layer is not necessarily provided in all cases, especially when the size of the solid-state detectors is constant.

Figure 5:
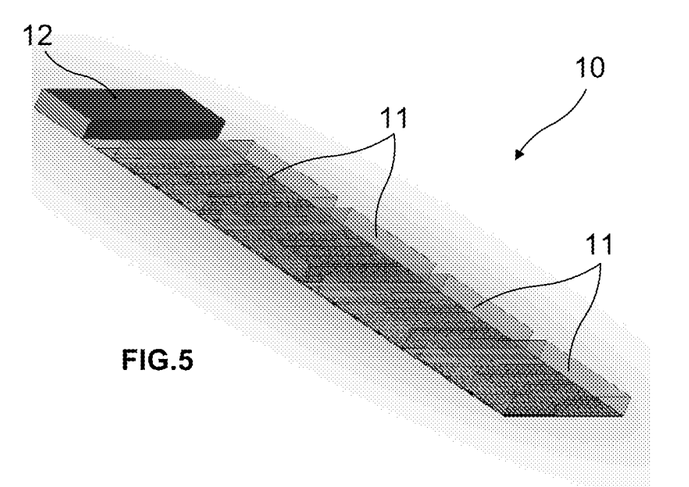

FIG. 5 shows the solid-state detectors 11 mounted on the intermediate kapton layer. In other embodiments, the solid-state detectors may be mounted directly on the readout element (e.g. ASIC). The pixel size in this preferred embodiment is chosen to be about 1 mm×1 mm. With a pixel pad of this size, it is possible to connect the solid-state detectors and the intermediate kapton layer or the ASICs and the intermediate kapton layer with conductive glue and avoid using solder bumps and hence heating the solid-state detector.

The obtained device 10 has in the shown preferred embodiment a solid-state detector with a length of 4 cm, a width of 2 cm and a thickness of 0.2 cm. The effective thickness of the device is approximately 2.2 mm (which includes the detector, the kapton layer(s) and the thinned ASIC).

The device 10 thus obtained, and shown in FIG. 1*a*, comprises a body having two parallel large faces (the front plane and the back plane) and substantially thin side edges. The operation of the device 10 according to the invention is the following.

A gamma ray (highly energetic photon) impacts the pixelated detector (11), which is mounted on device (10), on its thin side (as is schematically indicated in FIG. 1*a*). In prior art devices using solid-state detectors, these are usually oriented such as to capture gamma rays that impact on the larger face of the detector (i.e. in a direction of the electric field applied to the solid-state detector). According to the invention however, the device is oriented in such a way that it can capture gamma rays that impact on the thin side of the detector (i.e. in a direction perpendicular to the direction of the electric field applied to the detector).

In the device according the invention, gamma rays may also impact on another side, but as will be shown later, the main direction of impact will substantially be on the thin side. The probability of the photon to be captured in detector (11) increases with the distance travelled by the particle inside the detector material. At the point of impact of the captured photon, it will undergo different processes, and the dominant one is the photoelectric effect. After depositing all the energy in the detector (11), the equivalent amount of electron-holes (e-h) is released in response. A high voltage (HV) is applied to the detector to allow the e-h to drift inducing a signal on the pixel electrode, which is later amplified and processed by the ASIC. The ASIC (30) will indicate the position of the impact point and hence the coordinate of the pixel where impact occurred. Additionally, the signal pulse will give information about the energy of the photon. Furthermore, the time of the impact with respect to a global clock can be determined from the rising time of the signal produced.

Following, a module for detecting highly energetic photons will be described.

Figure 6A:
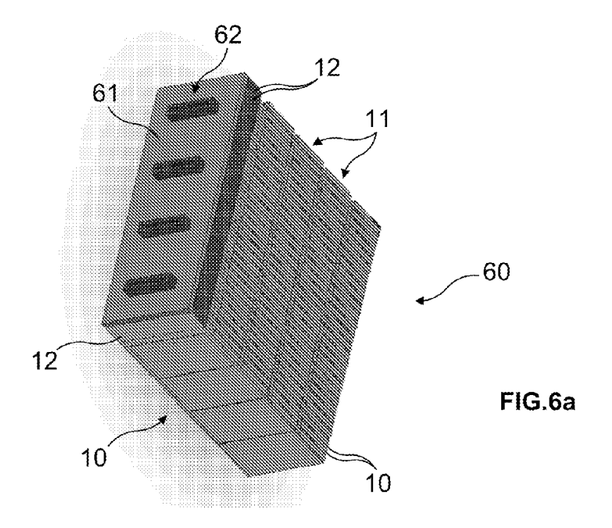
FIG. 6a is a schematic representation of the module for detecting highly energetic photons, according to the invention.

As can be seen in FIG. 6*a*, the module 60 comprises a plurality of devices 10 for detecting highly energetic photons (described above) which are connected through their input/output elements 12 to an interface, which in this case is a printed circuit board 61 (PCB) The devices are arranged in a row with their large faces adjacent to each other. It does not matter whether they are all arranged with the front sides of the base layers aimed in the same direction, or not. Obviously, due to the modularity of the devices 10, the module 60 can be of any size the designers prefer. In the case of FIG. 6*a*, the module comprises thirty devices. Using the size of the devices that was used before, the module thus obtains a thickness of approximately 6.6 cm.

The PCB 61 comprises connectors 62, for example, with low profile, for accessing the ASICs 30, that is, the connectors 62 of the PCB are connected with the input/output signal connectors 12, which have access (through connectors 20) to the ASICs. This way, the processed data in the ASICs 30 can be obtained in the connectors 62 and read from them. Optionally, such a module comprises devices, wherein the pixelated solid-state detector, the readout element and the input/output signal element are received on a top side of the kapton layer and wherein the bottom side of the kapton layer comprises means for providing a high voltage to polarize the pixelated solid-state detectors on an adjacent device.

Each pixelated solid-state detector, essentially can give two dimensional information about where impact with a gamma ray occurred, as was described before. In the module, a plurality of devices is arranged in such a way that a three-dimensional solid-state detector is obtained. Every device is a two-dimensional detector, but by providing a number of devices on top of each other, a three-dimensional detector is obtained. The dimensions of module 60, using the dimensions previously mentioned with respect to FIG. 5, are approximately 5 cm×2 cm×6.6 cm and it contains 48000 voxels. Each voxel having the dimensions 1 mm×1 mm×2 mm and being connected to its own independent pixel channel on ASIC 30. This is equivalent to having approximately 725 channels/cm$^3$.

The working principle of the module is still the same. A gamma ray impacts a pixelated detector. At the point of impact of the captured photon, electron-holes (e-h) are created. Due to the applied high voltage, the e-h drift inducing a signal on the pixel electrode, which is later amplified and processed by the ASIC. The ASIC will indicate the position of the impact point and hence the coordinate of the pixel where impact occurred. Additionally, the interface or PCB (61) has data on which ASIC the event was registered. The PCB thus has data about the coordinate of the voxel where impact occurred.

Figure 6B:
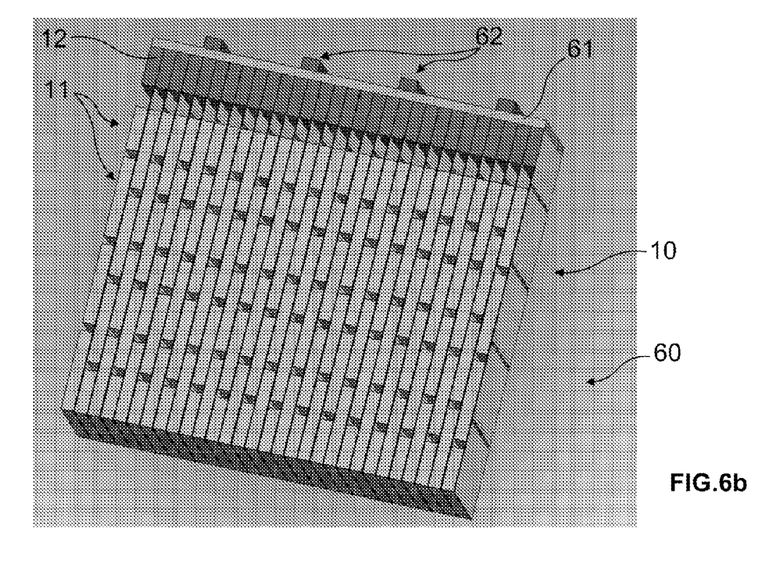
FIG. 6b is a schematic representation of the module for detecting highly energetic photons of FIG. 6a with a staggered configuration.

In some embodiments, such as shown in FIG. 6*b*, in order to obtain a stronger module, the detectors 11 of the devices 10 comprised in the module have different sizes and are provided in a staggered configuration. In this way, the gaps between the pixelated detectors 11 of a device are compensated with the pixelated detectors of the adjacent devices. In summary, this configuration gives more mechanical strength for the module 60 to hold itself. Obviously, this has no further consequences for the functionality of the module.

It should be noted that the device shown in FIG. 1*b* is especially suited to be used in such a staggered configuration. A single device can namely be provided with a staggered configuration between the solid-state detectors on one side of the device and the solid-state detectors on the other side.

Next, a system for detecting highly energetic photons will be described.

Figure 7:
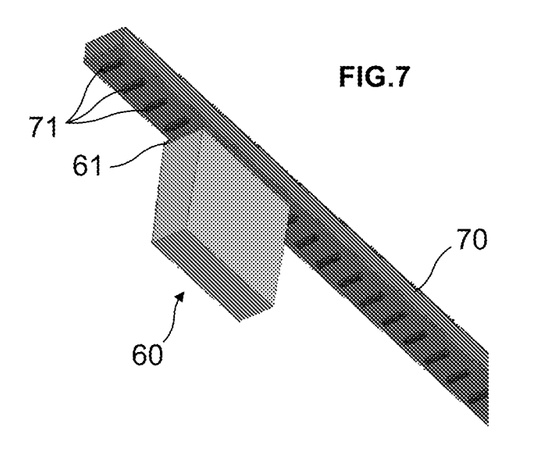
FIG. 7 is a schematic representation of the module of FIG. 6 mounted in a support for obtaining a system for detecting highly energetic photons, according to the invention.

FIG. 7 illustrates an interface bus 70 to which a module 60 is connected. The interface bus in this embodiment is a PCB. PCB 70 comprises a plurality of connectors 71, and the connectors 62 of interface 61 are plugged to the connectors 71 of PCB 70. This way, a system for detecting highly energetic photons is obtained. Said system can comprise one or more modules depending on the requirements (that is, depending on the size to be scanned). Interface bus 70 can supply the high voltages for the solid-state detectors, and provide power to, read from and write to the ASICs.

Figure 8:
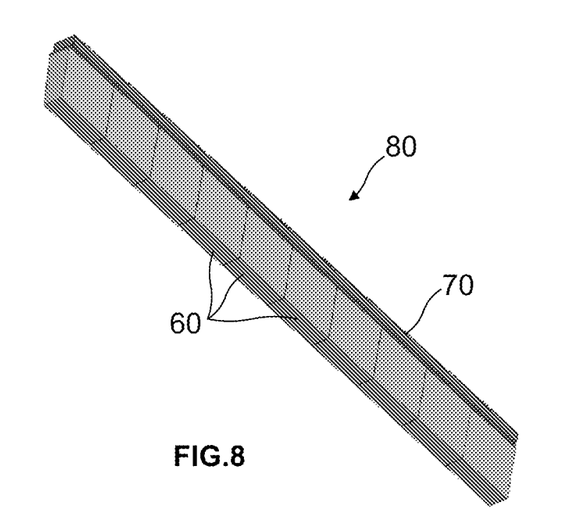

FIG. 8 shows the system 80 comprising a plurality of modules 60. Said modules 60 are arranged in a row, such that a large face of an end device of a module is adjacent to a large face of an end device of the next module (the modules are aligned in the same direction of the applied electric field inside the pixelated solid-state detectors).

It will be clear to the skilled person, that many another possible arrangements of modules to form a system may also be used.

From the described system 80 for detecting highly energetic photons it is possible to obtain different medical diagnostic imaging apparatus.

Figure 9A:
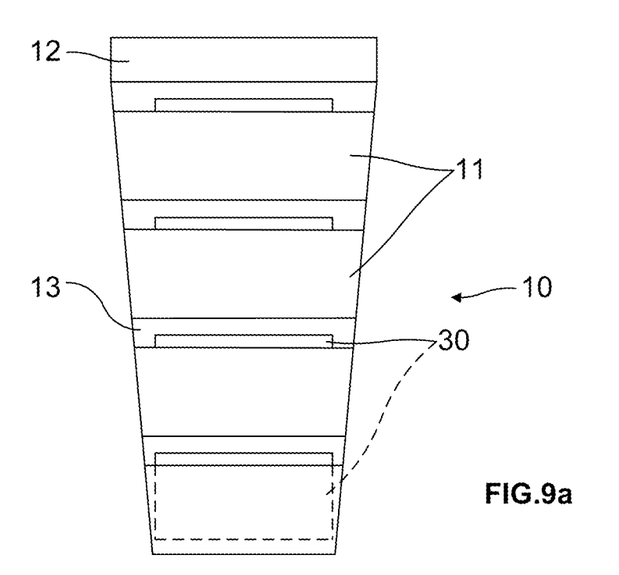
FIGS. 9a and 9b are top views of yet another embodiment of the device according to the present invention, the device having a shape of an isosceles trapezoid.

FIG. 9a illustrates a different embodiment of a device according to the invention. Device 10 comprises a body having two parallel large faces and substantially thin side edges, the large faces having a shape of an isosceles trapezoid. This shape has been obtained by giving the base layer of the device the shape of an isosceles trapezoid (and adapting the other elements of the device appropriately). The solid-state detectors 11 used in this embodiment have a shape of an isosceles trapezoid. The ASICs 30 however are rectangular. An intermediate kapton layer that was mentioned before may be necessary in these embodiments to adapt for any offset between the pixels on detector 11 and corresponding pixel channels on ASIC 30. ASICs 30 are partly indicated in a dashed line since they are arranged underneath the detectors and hence are not entirely visible.

The chosen shape of the device allows for the construction of a detector especially suitable for a PET scanner, since it can be fitted in a ring without significant gaps between the modules. In PET scanners, two photons need to be registered in the same time-window (coincidence) to be able to form the Line of Response (LOR). In prior art devices, wedge-shaped gaps are present between detectors (or modules) (see e.g. in FIG. 14). Since these gaps are present on either end of the LOR, this leads to a reduction of the detection efficiency of the PET scanner which is quadratic. This means that if the detection efficiency of single 511 keV photon is 25%, then the probability to detect two photons back-to-back is $(0.25)^2=0.0625$, so approximately 6%. With the isosceles trapezoidal shape of the detectors, the modules of the PET scanner can be fitted in a substantially uniform ring without wedge-shaped gaps between adjacent modules and thus maintain good detection efficiency.

Figure 9B:
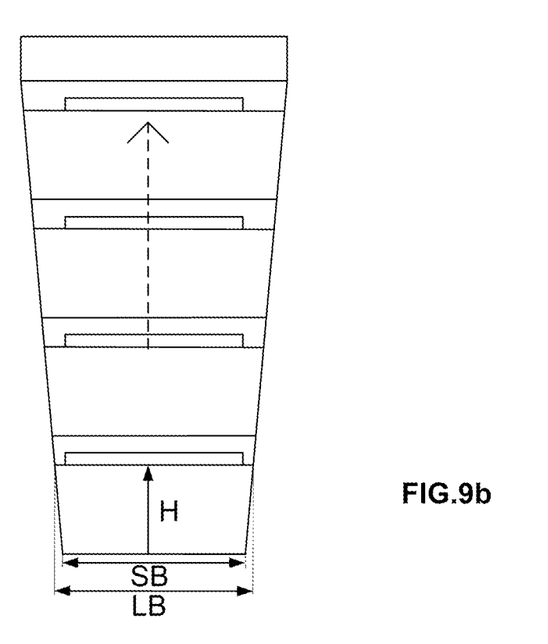

FIG. 9b shows the same device as FIG. 9a. In a preferred embodiment according to the present invention, 120 trapezoidal devices together form a ring which is part of a PET scanner. The dotted arrow indicates a radial direction of the PET scanner. As can be clearly seen, the size of the pixelated solid-state detector changes along this radial direction. In this embodiment, in order to compensate for any offset between the pixel pads of the detectors and the pixel channels of the readout elements, an intermediate kapton layer is provided.

In this embodiment, the height of the solid-state detector H equals 1 cm. The length of the short base (SB) of the first detector is 19.95 mm and the length of the long base (LB) of the first detector is 20.47 mm. These measurements are based on a PET scanner with a radius of 40 cm, 120 devices along its circumference and a clearance of 100 μm between adjacent devices.

Figure 10:
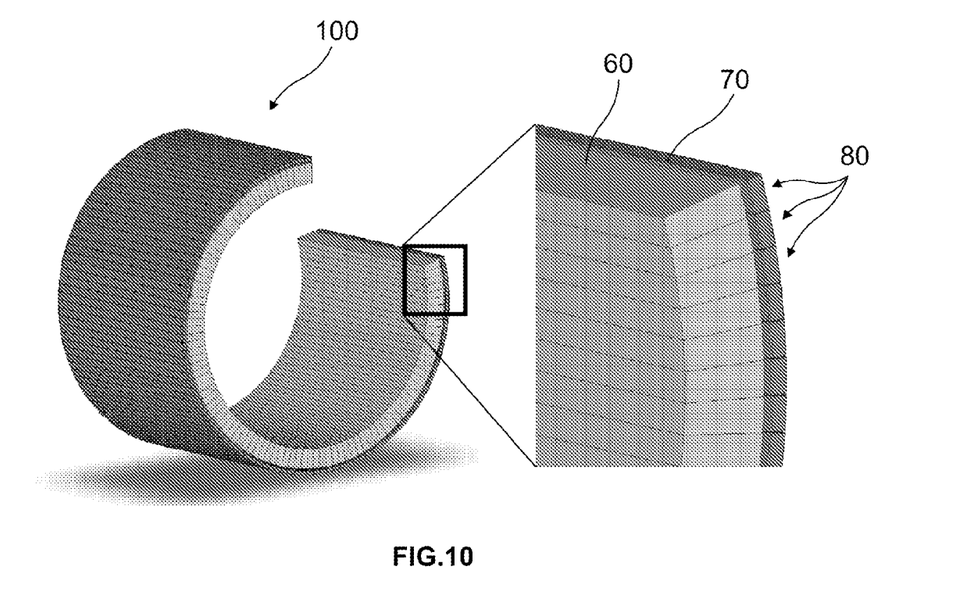
FIG. 10 is a schematic representation of a partial view of a gamma ray detector having a shape of a ring, which comprises a plurality of systems of FIG. 8.

FIG. 10 shows a partial view of a detector 100 of a PET scanner. Said detector 100 of a PET scanner has a shape of a ring and it comprises a plurality of systems 80 for detecting highly energetic photons as described above. At least some devices of the systems comprise base layers having a shape of the isosceles trapezoid, which allows obtaining the shape of a ring.

Basically, the systems 80 are piled to form the ring, that is, the plurality of systems are arranged forming the ring with the side edges of the devices 10 adjacent to each other. This way, the shape of the systems forms a hermetic geometry.

Figure 11:
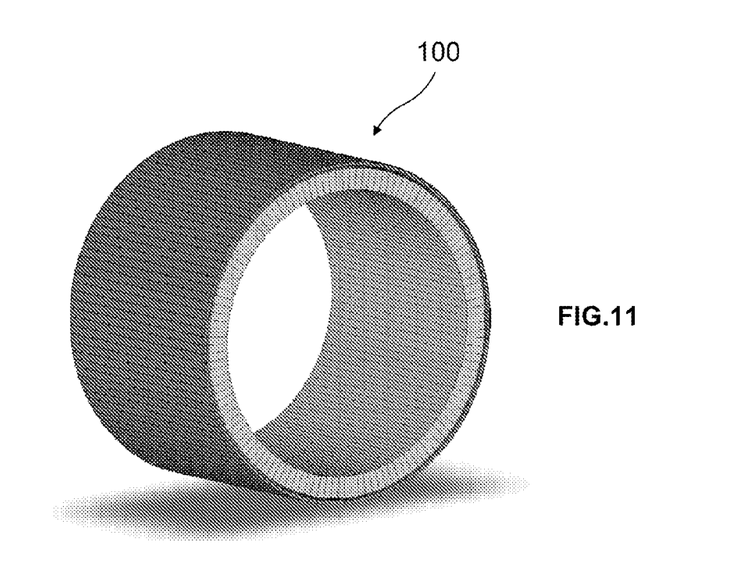
FIG. 11 is a schematic representation of the complete view of the gamma ray detector of FIG. 10.

FIG. 11 shows a complete ring 100 (that is, the gamma ray detector) for a PET scanner. In this example, the detector 100 has a Field of View (FoV) of 66 cm with a standard size gantry of 80 cm. It has 4 cm of CdTe detector 11 in the radial direction that can effectively stop 90% of 511 keV gammas. This means the detection efficiency for PET events with such a device is 81%.

Consequently, a PET scanner comprises the ring 100 of systems 80 surrounding a bed on which the patient is to lie. Each system (it can be understood as a sector of the ring) comprises at least one module 60, and each module comprises a plurality of devices 10.

The operation of the PET scanner comprising the devices 10 of the invention is the following. The PET detector (100) is made of many devices (10). After the parent nuclide decays, positrons with energy around 1 MeV are released. These positrons travel on average about 1 mm before annihilation with the electrons in the human body. This annihilation process produces 2 gamma photons moving in opposite direction each having an energy of 511 keV (the rest mass of the electron-positron pair). The two gamma rays are registered by a solid-state detector and the Line of Response (LOR) can be constructed. Due to the fact that the detector according to the invention is three-dimensional, the so-called parallax effect can be avoided. A vertex point where there is an extra accumulation of the radionuclide, and hence extra positron emitters, can be located because many LOR will intersect at the "same point". Thanks to the improved detector, the reconstruction of the LOR can be improved and the quality of detection of a concentration of radionuclide (which may indicate the presence of cancer cells) can also be improved.

From the above explanation and from FIGS. 9-11, it should be clear that the gamma rays will primarily impact the solid-state detectors at the thin side of the detectors, i.e. in a direction perpendicular to the electric field applied to the detector.

In case of the large faces of the devices 10 has a shape of a parallelogram (for example, a square or a rectangle) it is possible to obtain a gamma ray detector for a gamma camera.

Figure 12:
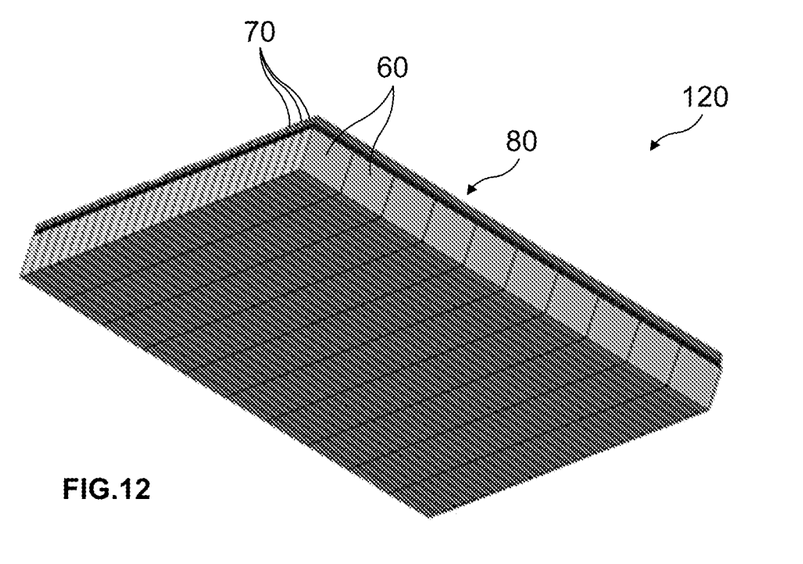
FIG. 12 is a schematic representation of a gamma ray detector having a shape of a parallelepiped, which comprises a plurality of systems of FIG. 8.

Thus, FIG. 12 illustrates a gamma ray detector 120 for a gamma camera. Said detector 120 comprises a plurality of systems 80 as described above. The plurality of systems is arranged forming a rectangular prism with the side edges of the devices adjacent to each other. In the case of FIG. 12, the gamma ray detector 120 comprises thirty systems and this will lead to a detector with dimensions close to 66 cm×66 cm. The dimension of the detector can be made larger without problem. This is possible due to the modularity of the devices 10, the modules 60 and the systems 80.

The operation of the gamma camera comprising the devices 10 of the invention is the following.

The Gamma Camera is expected to detect photons within an energy range from 140 keV ($^{99}Tc^m$) to 777 keV ($^{82}Rb$) depending on the type of radionuclide used. A suitable collimator may be positioned in front of the detector to select the direction of the photons incident on the camera. The energetic photons interact with device (10) and only the information about the energy deposited and the voxel coordinates are used. Timing information in this modality is not applicable.

In SPECT imaging, a gamma camera and a radionuclide emitting a positron and only one 511 keV photon are used. The image of the SPECT is usually obtained by taking multiple images at different angles using the gamma camera.

Figure 13:
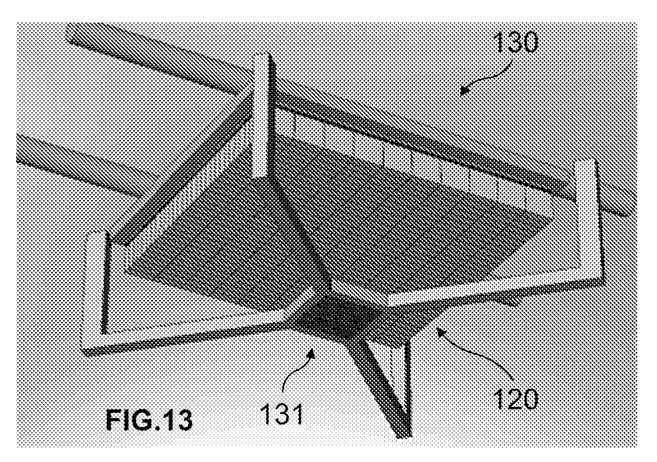
FIG. 13 is a schematic representation of a Compton camera, which comprises the detector of FIG. 12.

FIG. 13 shows an example of a Compton camera 130. Compton scattering takes place at a first plane and the second plane is the gamma ray detector 120 as described above, where the X-ray get captured after being scattered.

The advantages of this design of the detector for the Compton camera are:
- the detector 120 for the gamma rays can be made as thick as needed to improve its absorption efficiency for high energy gamma;
- the dimensions of the gamma ray detector 120 can be made as large as needed;
- the detector 120 response is good for wide energy range;
- the parallax effect in the detector 120 can be avoided since the detector has a small voxel volume. In the illustrated example, it is 1 mm×1 mm×2 mm. It could be much smaller if needed since this has to do with the patterning of the pixel electrode which practically has 1 μm spatial resolution.

Another advantageous application of the device, module, system and detectors according to the present invention may be in CT scanning. In CT scanning, an X-ray source is positioned on one side of a patient's body and a detector is positioned on the other side. The X-ray source and detector are then moved with respect to a patient. The photons captured by the detector give an indication of the attenuation of the X-rays by the tissue of the patient's body parts (organs, bones etc.). Using the different attenuation rates of different tissues, an image of a patient can be obtained.

The sensor used in CT scanning, typically has to detect photons within an energy range of 80 keV-140 keV. One of the advantages of using a pixelated solid-state detector in the device according to the invention is that the pixel size can be varied within the same detector (which is impossible with prior art detectors based on scintillating crystals). In a preferred embodiment of the invention, a detector for CT scanning is made from a plurality of devices (or modules or systems) in which the pixel size varies within a single detector. Preferably, the pixel size at the "front" of the device (where the photon enters the detector), the pixel size is reduced, e.g. 100 μm×100 μm. The pixel size then gradually increases towards the "back" of the detector. For example, the next row of pixels may be of 100 μm×200 μm, the following row of 100 μm×300 μm.

This configuration has the advantage that with a reduced number of pixel channels, the photons with lower energy can still be captured with increased precision and reduced parallax, while photons with higher energy are likely captured toward the back of the device.

Since the energy range (80 keV-140 keV) of the photons in CT scanning is small compared to e.g. PET scanning (511 keV), the height (H as defined in FIG. 9b) of the detector can also be smaller (when using the same detector material). As described before, all devices that were used to build the module to be applied in a PET scanner were each provided with 4 pixelated solid-state detectors (in the configuration shown in FIG. 1a; 8 solid-state detectors with the configuration of FIG. 1b). Each solid-state detector had a size of 1 cm×2 cm×0.2 cm. The total height of the detector in this case was thus 4 cm. In the case of a CT scanner for example, only one CdTe detector with a size of 0.5 cm×2 cm×0.2 cm (using the configuration shown in FIG. 1a) would have to be provided to capture approximately 100% of the photons emitted by the X-ray source of the CT scanner. Clearly, in the configuration shown in FIG. 1b, two detectors of this size would be provided.

Although the present invention has been described in detail for purpose of illustration, it is understood that such detail is solely for that purpose, and variations can be made therein by those skilled in the art without departing from the scope of the invention.

The invention claimed is:

1. A module for detecting highly energetic photons comprising:
   a plurality of devices for detecting highly energetic photons, each of said devices comprising:
      one or more pixelated solid-state semiconductor detectors for detecting the highly energetic photons, the detectors being polarized in use;
      one or more readout elements connected to said pixelated solid-state semiconductor detectors;
      an input/output element connected to said readout elements for data input and output; and
      a base layer for mounting the pixelated solid-state semiconductor detectors, the readout elements and the input/output element, wherein
   each pixelated solid-state semiconductor detector is mounted on a readout element, and wherein
   said devices are disposed on top of each other, such that the devices support each other.

2. A module according to claim 1, wherein the base layers of the devices have an isosceles trapezoidal shape with exactly one pair of parallel sides.

3. A module according to claim 2, wherein at least one pixelated solid state semiconductor detector has an isosceles trapezoidal shape with exactly one pair of parallel sides.

4. A module according to claim 1, wherein the base layers of the devices have a rectangular shape.

5. A module for detecting highly energetic photons according to claim 1, wherein the input/output elements of the plurality of devices are connected to a single PCB.

6. A module for detecting highly energetic photons according to claim 5, wherein at least part of the solid-state semiconductor detectors of the devices are disposed on top of each other in a staggered way.

7. A module according to claim 1, comprising devices, wherein the pixelated solid-state semiconductor detector, the readout element, and the input/output element are received on a top side of the base layer and wherein the bottom side of the same base layer comprises means for providing a high voltage to polarize the pixelated solid state semiconductor detectors of an adjacent device.

8. A module according to claim 1, wherein the base layers of the devices have an isosceles trapezoidal shape with exactly one pair of parallel sides and the pixelated solid state semiconductor detectors have a substantially rectangular shape,
   the module further comprising an intermediate base layer between the solid-state semiconductor detectors and the readout elements to adapt for any offset between the pixel pads of the solid state semiconductor detectors and corresponding pixel channels on the readout elements.

9. A module according to claim 1 comprising at least one device that comprises at least one pixelated solid-state semiconductor detector in which the pixel size varies.

10. A system for detecting highly energetic photons comprising a plurality of modules according to claim 1, wherein in each of the modules the input/output elements of the plurality of devices are connected to a single interface, and wherein the plurality of interfaces of the modules are connected through suitable connectors to a single interface bus.

11. A system according to claim 10, comprising solely modules;
   wherein the base layers of the devices have an isosceles trapezoidal shape with exactly one pair of parallel sides; and;

wherein at least one pixelated solid-state semiconductor detector has an isosceles trapezoidal shape with exactly one pair of parallel sides.

12. A ring-shaped detector for a PET scanner comprising a plurality of systems according to claim 11.

13. A system according to claim 10, comprising solely modules;
wherein the base layers of the devices have a rectangular shape.

14. A gamma camera comprising a detector having a plurality of systems according to claim 13.

15. A Compton camera comprising a detector having a plurality of systems according to claim 13.

16. A system according to claim 10;
wherein the input/output elements of the plurality of devices are connected to a single PCB and,
wherein said PCB is adapted to supply high voltages for the pixelated solid-state semiconductor detectors.

17. A module for detecting highly energetic photons comprising:
a plurality of devices for detecting highly energetic photons disposed on top of each other in a staggered manner, each of said devices comprising
one or more pixelated solid-state semiconductor detectors for detecting the highly energetic photons;
an ASIC connected to each of said pixelated solid-state semiconductor detectors;
an input/output element connected to said ASICs for data input and output; and
a base layer upon which the pixelated solid-state semiconductor detectors, the ASICs and the input/output element are mounted.

18. A module according to claim 17, wherein the pixelated solid-state semiconductor detectors are mounted on the ASICs.

19. A module according to claim 17, wherein the base layers and the pixelated solid-state semiconductor detectors of the devices have an isosceles trapezoidal shape with exactly one pair of parallel sides.

20. A system for detecting highly energetic photons comprising a plurality of modules according to claim 18, said modules connected to a printed circuit board.

21. A module for detecting highly energetic photons comprising:
a plurality of devices for detecting highly energetic photons stacked on top of each other including at least a first device, and a second device stacked on top of the first device, wherein
the first and second devices both comprise
a base layer;
one or more ASICs mounted on a top side of the base layer, and one or more pixelated solid-state semiconductor detectors for detecting the highly energetic photons mounted on each of the ASICs, wherein the detectors are polarized in use; and
an input/output element connected to the ASICs for data input and output;
and wherein the bottom side of the base layer of the first device serves to polarize the second device.

* * * * *